United States Patent
Duane

(10) Patent No.: US 9,392,013 B1
(45) Date of Patent: *Jul. 12, 2016

(54) DEFENDING AGAINST A CYBER ATTACK VIA ASSET OVERLAY MAPPING

(71) Applicant: EMC Corporation, Hopkinton, MA (US)

(72) Inventor: William M. Duane, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/698,201

(22) Filed: Apr. 28, 2015

Related U.S. Application Data

(63) Continuation of application No. 13/795,025, filed on Mar. 12, 2013, now Pat. No. 9,049,226.

(51) Int. Cl.
  *G06F 21/00* (2013.01)
  *H04L 29/06* (2006.01)
  *G06N 5/00* (2006.01)
  *G06Q 10/00* (2012.01)

(52) U.S. Cl.
  CPC ........ *H04L 63/1433* (2013.01); *H04L 63/1416* (2013.01); *H04L 63/1441* (2013.01)

(58) Field of Classification Search
  CPC ............ H04L 63/1433; H04L 63/1441; H04L 63/1416
  See application file for complete search history.

(56) References Cited

U.S. PATENT DOCUMENTS

| 8,150,783 B2* | 4/2012 | Gonsalves | G06N 7/005 706/10 |
| 2013/0086376 A1* | 4/2013 | Haynes | G06F 21/577 713/155 |

FOREIGN PATENT DOCUMENTS

| WO | WO 2011162848 A2 * | 12/2011 | G06Q 10/00 |
| WO | 2013044192 A2 | 3/2013 | |

OTHER PUBLICATIONS

Mudhakar Srivatsa, Li Xiong, Ling Liu; "TrustGuard: countering vulnerabilities in reputation management for decentralized overlay networks"; May 2005; WWW '05: Proceedings of the 14th international conference on World Wide Web; Publisher: ACM; pp. 422-431.*

(Continued)

*Primary Examiner* — Andrew Nalven
*Assistant Examiner* — Courtney Fields
(74) *Attorney, Agent, or Firm* — Ryan, Mason & Lewis, LLP

(57) ABSTRACT

Methods, apparatus and articles of manufacture for defending against a cyber attack via asset overlay mapping are provided herein. A method includes determining which of multiple systems within an organization stores each of multiple assets; determining a set of relationships present between the multiple assets across the multiple systems; identifying, upon an attack of a first of the multiple systems, one or more additional systems of the multiple systems vulnerable to the attack based on at least one relationship, from the determined set of relationships, between one or more of the multiple assets stored on the first system and one or more of the multiple assets stored on the additional systems; and automatically prohibiting access to the one or more additional systems storing the one or more of the multiple assets identified based on the at least one relationship with the assets stored on the first system.

20 Claims, 5 Drawing Sheets

(56) References Cited

OTHER PUBLICATIONS

Asif et al. Intrusion Detection System Using Honey Token Based Encrypted Pointers to Mitigate Cyber Threats for Critical Infrastructure Networks, Systems, Man and Cybernetics (SMC), 2014 IEEE International Conference on DOI: 10.1109/SMC.2014.6974088; Publication Year: 2014; pp. 1266-1270.

* cited by examiner

ASSET OVERLAY MAP

DEFENDING AGAINST A CYBER ATTACK VIA ASSET OVERLAY MAPPING

CROSS-REFERENCE TO RELATED APPLICATIONS

The present application is a continuation application of U.S. patent application Ser. No. 13/795,025, filed Mar. 12, 2013, which is incorporated by reference herein.

FIELD

The field relates generally to information technology (IT), and more particularly to incident response management.

BACKGROUND

During a breach event in an IT network or system of an organization, a critical incident response (CIR) staff (or similar personnel) is often encountered with a significant number of security related events and alerts, some of which can be related to an attacker attempting to access critical assets within the organization. Existing incident response approaches attempt to gather and filter security events, and correlate such events so as to potentially reduce the number of events which need to be examined by CIR staff. However, such approaches nonetheless leave a considerable number of events to be manually processed by a CIR staff (which is commonly a small team of individuals).

By way of example, many existing breach response tools are designed to detect attack patterns and detect when attacks are occurring by observing historical data from event logs and similar devices. However, such approaches do not make or identify a connection between a low-level attack progression and high-level enterprise processes which may contain data of interest. This is disadvantageous because while an attacker likely knows the identity of the ultimate asset of interest, the CIR personnel will need to evaluate the attacker's behavior and techniques from historical evidence in order to infer what the attacker is attempting to accomplish. Additionally, in existing approaches, CIR personnel examine and analyze information gathered after an event has occurred. If the event indicates some data loss, this loss has already occurred.

Accordingly, using existing approaches, once CIR personnel is able to identify that an attacker has penetrated a system, sufficient time may have elapsed so as to render the task of stopping an information leak considerably difficult.

SUMMARY

One or more illustrative embodiments of the present invention provide techniques for defending against a cyber attack via asset overlay mapping. In accordance with an aspect of the invention, a method is provided comprising the steps of determining which of multiple systems within an organization stores each of multiple assets; determining a set of at least one relationship present between the multiple assets across the multiple systems of the organization; identifying, upon an attack of a first system of the multiple systems within the organization, one or more additional systems of the multiple systems vulnerable to the attack based on at least one relationship, from the determined set of at least one relationship, between one or more of the multiple assets stored on the first system and one or more of the multiple assets stored on the one or more additional systems; and automatically prohibiting access to the one or more additional systems of the multiple systems storing the one or more of the multiple assets identified based on the at least one relationship with the one or more assets stored on the first system.

Another aspect of the invention or elements thereof can be implemented in the form of an article of manufacture tangibly embodying computer readable instructions which, when implemented, cause a computer to carry out method steps such as described herein. Further, another aspect of the invention or elements thereof can be implemented in the form of an apparatus or system that includes a memory and at least one processor that is coupled to the memory and configured to perform method steps such as described herein. Additionally, another aspect of the invention or elements thereof can be implemented in the form of means for carrying out the method steps described herein, or elements thereof. As detailed herein, such means can include hardware module(s) or a combination of hardware and software modules, wherein the software modules are stored in at least one tangible computer-readable storage medium.

The mapping techniques of the illustrative embodiments overcome one or more of the problems associated with the conventional techniques described previously, and facilitate the identification of assets related to targeted assets in a breach scenario so that prompt action may be taken to remove access to the related asset and/or data. As detailed herein, when one portion of an asset is attacked, the mapping techniques described herein allow other portions of an asset to be identified and protected before the attacker has touched those other portions. Such a mapping can also contain additional information to guide an administrator in preventing additional breach loss. These and other features and advantages of the present invention will become more readily apparent from the accompanying drawings and the following detailed description.

DETAILED DESCRIPTION

Figure 1:
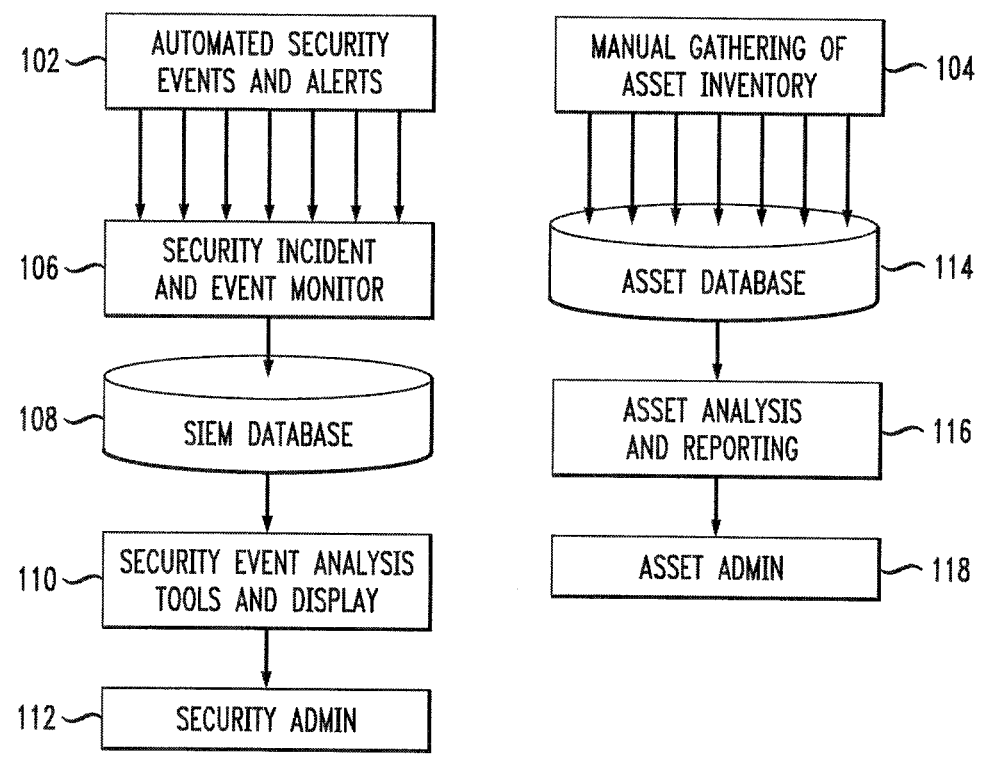
FIG. 1 is a diagram illustrating an example embodiment, according to an aspect of the invention.

As will be described, the present invention, in one or more illustrative embodiments, provides techniques for asset and/or data overlay mapping. Illustrative embodiments of the present invention will be described herein with reference to exemplary communication systems and associated processing devices. It is to be appreciated, however, that the invention is not restricted to use with the particular illustrative system and device configurations shown. By way of example, illustrative embodiments of the invention detailed herein include an asset overlay map implemented in conjunction with assets having component parts scattered across multiple systems within an organization.

At least one embodiment of the invention includes a semi-automated process to assist CIR personnel in creating an asset and/or data overlay map which identifies assets and/or data potentially being targeted during a breach. Further, at least one embodiment of the invention includes facilitating CIR personnel to efficiently identify related assets (that is, assets related to the asset(s) potentially being targeted in the breach) so that prompt and/or immediate action may be taken to remove access to the related assets. As used herein, terms including, for example, "CIR staff" and "security office," are intended to refer to any personnel within an organization responsible for responding to a cyber attack or an attempted cyber attack.

As further described herein, an aspect of the invention includes providing a mechanism to identify which items of enterprise data reside on which systems and servers within an organization, and well as to identify any relationship(s) between two or more of the items of enterprise data. Additionally, a further aspect of the invention includes providing an alert or a display signal to indicate when one system has been breached and/or attacked, and to identify any additional systems that are potentially likely to be attacked based upon a relationship of the assets on the attacked system to the assets residing on the additional system(s).

As described herein, the relationships between assets on one or more systems within an organization can be determined and represented via an asset overlay map. For example, an asset overlay map can indicate at least one relationship present between multiple assets residing on one or more systems within the organization. By way merely of example, credit card numbers may be stored on one system, while the cardholder names associated with the card numbers may be stored on a second system, and the billing address corresponding to each of the cards may be stored on a third system. The asset overlay map represents these relationships such that when an attacker is accessing credit card numbers, the asset and/or data overlay map will indicate that the systems containing the names and the billing addresses are at risk of subsequent attack, as detailed further herein.

As also detailed herein, an asset overlay map can be used to leverage techniques such as data leakage monitoring to periodically and automatically monitor certain data and/or assets. If such assets are moved to another system, at least one embodiment of the invention includes updating the asset overlay map with the asset transfer information such that the CIR staff has the latest possible view of the assets (via the asset overlay map).

As noted above, the techniques and tools used in existing approaches do not yield an understanding of what asset(s) might be targeted and/or vulnerable during an attack or breach, and therefore such existing approaches do not yield an indication of what systems may be potentially targeted for attack. By way of example, in a large corporation, the CIR staff is commonly a shared resource, dedicated to the protection of the entire corporation. As a result, it may be challenging or perhaps implausible to expect the CIR staff to understand and readily identify what asset(s) is critical in each division or group of the corporation. Moreover, it may be even more challenging for the CIR staff to understand the relationships between critical enterprise data running on various systems of the corporation. Further, even if CIR staff were to develop such an understanding, that information may rapidly become outdated as data moves and enterprise processes change.

Accordingly, an aspect of the invention includes the creation and implementation of an asset overlay map that indicates which systems (within an organization) house critical information, and wherein the asset overlay map is overlaid on top of a topological view of the organization environment. As such, CIR personnel can track the progress of an attack or breach from the (typically network centric) topological view of the network. An attacker's progress can be tracked, for example, by internet protocol (IP) address, port, accounts used, tools used, etc. Consequently, via utilization of an asset overlay map, CIR personnel can potentially stop an attacker before the attacker has gathered all of the necessary components of the targeted asset(s).

In accordance with at least one embodiment of the invention, creating an asset overlay map includes identifying assets (or, in an example embodiment, selected critical assets) in each division, group, and/or department of an organization. These identifications can be carried out, for example, by a risk office, a Chief Information Security office, etc. Gathering assets in connection with this identification step can include utilizing spreadsheets and/or lists compiled by enterprise personnel, as well as making use of comprehensive audits completed by an accredited third party.

During the gathering of asset information, at least one embodiment of the invention includes collecting additional information associated with each identified asset. By way of example, such additional information can include the system (the name, IP address, physical location, etc.) on which the asset resides, the organization (the department, group, etc.) that owns the asset, the contact for managing the asset, as well as the format of the stored form of the asset (for example, a credit card number may have the form "XXXX XXXX XXXX XXXX," where X can represent any digit between 0 and 9). As detailed herein, an aspect of the invention additionally includes determining and identifying assets and/or data items that are related to the assets at issue in an information gathering step. Examples of such assets can include billing information associated with credit card information, an encryption key for encrypted data, etc.

Additionally, in accordance with at least one embodiment of the invention, results of an asset survey and/or information gathering step can be generated in a form that is importable into other databases, such as comma-separated values (CSV), for example. It should also be noted that while an asset overlay map is described herein as encompassing a database, one skilled in the art would recognize and appreciate that an asset overlay map in accordance with one or more embodiments of the invention can encompass a logical construction whose data can be spread across multiple databases. In addition, an asset overlay map can be stored in structures other than a database, including structures such as flat files, spreadsheets, memory resident structures, etc.

As such, in an example embodiment of the invention, once the asset data is gathered from each of the divisions and/or groups of the organization, the data is loaded into a database contained in a CIR Center, where the data is associated with the systems which a CIR team is monitoring.

Accordingly, with this information gathered, the CIR team can determine which assets reside on a particular system, and the CIR team can also (quickly) determine which additional assets are related to assets that are under attack (if such a scenario arises). Because the noted database also contains the identity of each system within which these related assets reside, the CIR team can move quickly to disable access to such a system in order to protect the related assets before the attacker has a chance to progress or continue the attack to this system. Should physical access to these systems be needed to disable or physically disconnect the system from the network, at least one embodiment of the invention includes providing the CIR team with the physical location of that system as well as the identity of the agent or individual responsible for the relevant asset(s) on that system.

Additionally, at least one embodiment of the invention includes incorporating tools which can display the physical and logical topology of the network. By connecting an asset overlay map database of assets (for example, critical assets) to a display tool, when an attack is happening, the topology map can display the systems which are likely to be attacked next based on information derived from the asset overlay map. Specifically, such systems can be identified through the asset overlay map asset data, and in particular, the list of related assets. By way merely of example, an implementation of this aspect can include the map displaying nodes which are highlighted in a given color or flashing to indicate that they (that is, the relevant nodes) have data related to the node currently under attack.

Also, at least one embodiment of the invention includes adding and/or implementing automated processes to an asset overlay map, such that when an attack is detected on a system containing noted or critical assets, automated procedures are activated which lock-down or limit access to related assets automatically. Examples of such procedures may include requiring additional authentication to access the asset(s), and/or disabling movement of data off the system containing the related assets.

As also noted herein, asset survey data contained within an asset overlay map will become out of date over time. For instance, during the normal prosecution of business, assets and/or data are moved from one system to another, data is replicated in order to improve availability or performance, etc. In order to maintain effectiveness of an asset overlay map, at least one embodiment of the invention includes maintaining the asset survey data as current as possible. Techniques for maintaining current asset data can include the following.

For example, at least one embodiment of the invention includes a manual process that includes periodically auditing and reviewing the asset data. Also, at least one or more procedures can be implemented to identify certain (for example, critical) assets that reside on all new systems being connected to the network. Additionally, at least one embodiment of the invention includes automated scanning to identify the location, movement, and/or replication of asset data. Because asset data includes fields which identify the format and/or tagging associated with the given asset data, automated scanning tools can periodically run on systems to scan the system for the presence of asset data. These scans can detect when new instances of the asset data appear, and can also detect when the asset data has moved to a new system. Further, such automated scanning tools can detect when unexpected copies of certain (for example, critical) asset data appear.

FIG. 1 is a diagram illustrating an example embodiment, according to an aspect of the invention. Security events and alerts 102 can be automatically sent by systems, firewalls, servers, and other devices to one or more Security Incident and Event Monitoring (HEM) tools 106. Such a tool 106 gathers the events into one or more SIEM databases 108. Security monitoring tools are used to correlate the security event data and produce a view or display 110 of what is happening from a system and/or network point of view for a security administrator (admin) 112.

Additionally, asset administrators 118 (including, for example, risk officers and/or business managers) often have processes that are utilized to manually survey an organization and build a list of critical assets belonging to the organization 104. Examples of these assets may include data such as credit card information, or personally identifying information (PII) such as names and addresses, or additional data such as any forms of sensitive enterprise or business data. Often these asset inventories are gathered into an asset database 114 and used for a reporting 116, so that an organization can, for example, report on regulatory compliance or develop a profile of risk for the organization.

Note that in large organizations, it is not uncommon to have a single shared group which manages the networking and security infrastructure shared by the entire organization. On the other hand, organizations can also have a separate risk officer for each division or unit, responsible for building, managing, and maintaining the asset inventory for that division as needed to meet the risk and compliance obligations of the division.

While common, such a division of responsibilities and information has a significant downfall, as noted herein. For example, when attacks against an organization occur, the attacks are often detected through the security administrator using the information and tools at their disposal. This means that the security officer will observe the progression of an attack as it progresses through the network and systems attached to that network. The security officer will observe the attacker moving from system to system, perhaps taking data (assets) from one system, and perhaps ex-filtrating that asset outside of the organization.

Unfortunately, this common scenario raises multiple problems. For instance, the security officer will not know about the access and ex-filtration of the asset until after it has occurred and been reported through the SIEM tools. At this point, it is too late to stop the ex-filtration of the asset. Also, because the view of the security officer is from the system and network point of view, the security officer likely does not know what asset has been compromised, nor does the security officer know what other assets may be related to the compromised asset. This information is maintained and controlled by the asset administrator.

Accordingly, and as detailed herein, aspects of the invention include providing processes to deal with one or both of these problems.

By way of illustration, assume that assets are composed of multiple separable sets of sub-assets. For example, if an attacker wants to compromise a set of credit card information, the attacker will need to gather the following information:
  Credit Card Numbers;
  Names associated with each credit card number;
  Addresses associated with each name; and
  Card code verification (CCV) codes associated with each credit card.

In this scenario, the credit card data can be referred to as comprising all of this information as the asset, and each of the line items can be referred to as a sub-asset. Further, assume that the asset owner has taken care to secure this information by encrypting the data. If a different encryption key is used to protect each sub-asset, then these four encryption keys will be sub-assets themselves because the attacker will need these keys to make use of the data as well.

If all of the sub-assets are contained in the same database, as is commonly done in existing approaches, the challenge facing an attacker is significantly less daunting. An attacker simply needs to access the single database in order to gather all of the assets at once. In existing approaches, moreover, the event of copying the single database will be logged and noticed by the security administrator only after the event has occurred.

Accordingly, at least one embodiment of the invention includes a process for handling multiple assets (or sub-assets) and a method for linking the security database to the asset database. Additionally, one or more embodiments of the invention include maintaining all sub-assets in separate databases, preferably on separate systems. Further, all keys protecting the sub-assets are maintained in separate systems (that is, the keys are treated like any other sub-asset). Also, a new database can be composed in one or more embodiments of the invention which identifies all of the sub-assets associated with each asset. For each sub-asset, at least one embodiment of the invention includes creating an entry in a database that indicates on which system each sub-asset resides, and to which asset the sub-asset belongs.

Figure 2:
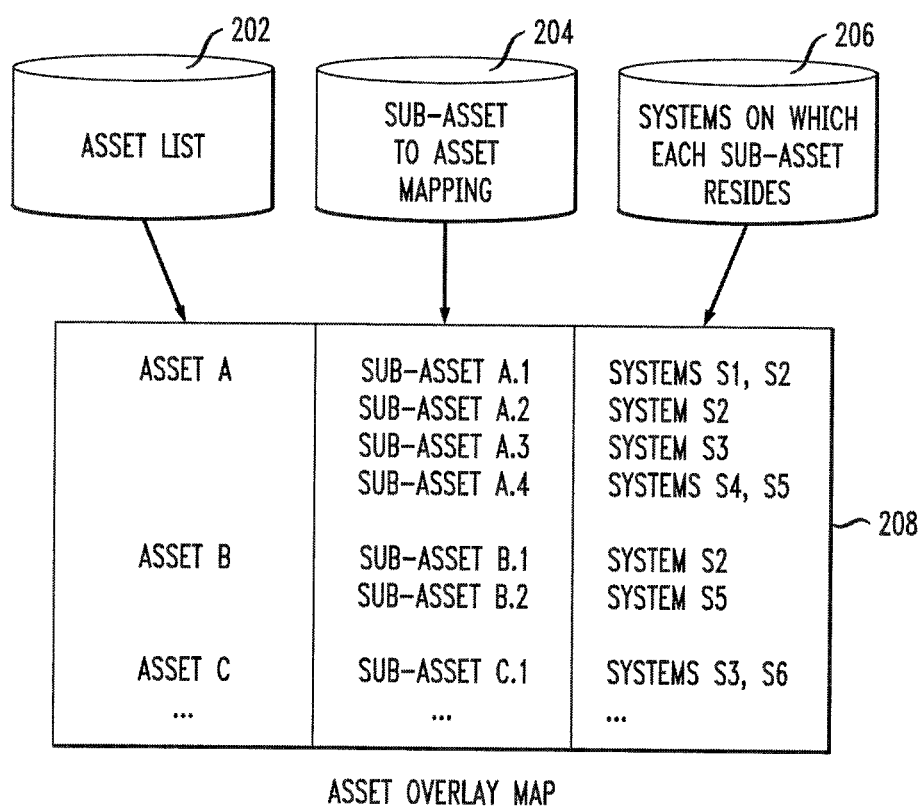
FIG. 2 is a diagram illustrating an example embodiment, according to an aspect of the invention.

Visually, FIG. 2 offers an example of how this information can be used to generate a logical or physical table which correlates the information. Accordingly, FIG. 2 is a diagram illustrating an example embodiment, according to an aspect of the invention. By way of illustration FIG. 2 depicts an asset list database 202, a sub-asset to asset mapping database 204, and a database 206 for systems on which each sub-asset resides, wherein each of these three databases provide input to an asset overlay map 208, as further detailed below.

For example, in FIG. 2, assume Asset A represents Credit Card information. Sub-asset A.1 can represent the Credit Card Number, which has two copies, one residing on System S1 and another copy residing on System S2. Similarly, Sub-asset A.2 can represent the encryption key used to protect Sub-asset A.1, and it resides on System S2. Next, Sub-asset A3 can represent the name of the credit card holder, and this sub-asset resides on System S3. Further, Sub-asset A.4 represents the address for the credit card holder. This structure, which correlates the assets to the sub-assets and with the systems on which the sub-assets reside, is referred to herein as the asset overlay map 208.

Note that FIG. 2 includes examples of where one sub-asset has multiple copies in the organization. For instance, refer to Sub-asset A.1, which resides on both System 1 and System 2. Conversely, FIG. 2 also illustrates a situation where different sub-assets reside on the same system; refer to Sub-assets A.2 and B.1, both residing on system S2.

Assuming such Asset Overlay Map 208 is in place, a method can be established for stopping an attacker from accessing targeted assets. Assume that in the above example, an attacker is determined to obtain credit card information. As noted before, in existing approaches, the security officer will only be able to detect an attack against a system after-the-fact by examining the security alerts and events generated by the attacked system. Assume that, in this instance, the attacker has breached System S1, and has obtained a copy of the encrypted list (or database) of credit card numbers. According to an example embodiment of the invention, the following steps can be carried out:

When an attack is underway, the security officer will be alerted that a compromise of System S1 has occurred.

By use of the asset overlay map 208, the security officer can determine that in this example, only information related to Asset A (credit card information) is under attack, because the asset overlay map lists no other assets residing on System S1.

Further, via the asset overlay map 208, the security officer can identify that Sub-assets A.2, A.3, and A.4 are part of Asset A.

Also, via the asset overlay map 208, the security officer can identify that these Sub-assets reside on systems S1, S2, S3, S4, and S5.

At this early stage of this example attack, the attacker has only breached System S1, yet the security officer can quickly move to isolate or disable access to systems S2, S3, S4, and S5.

Accordingly, in this example, the asset overlay map 208 has been used to detect when one part of an asset has been compromised, and further to stop the attacker from gaining access to the remaining sub-assets and thereby stop the breach. In this example, the attacker may have been able to gain access to an encrypted copy of the credit card numbers (Sub-asset A.1 on System S1), but without the decryption key (Sub-asset A.2, System S2), or the card holder name (Sub-asset A.3, System S3), or the card holder address (Sub-asset A.4, Systems S4 and S5), the attacker cannot make use of the information gathered and a full breach has been prevented.

Utilizing the same example, if the attacker were to breach System S3, it would not be known if the attacker was attempting to compromise Asset A or Asset C, but by using the asset overlay map 208, the security officer can disable access to systems S1, S2, S4, S5, and S6, thereby protecting the remaining sub-assets associated with both Asset A and Asset C and prevent further breach. Moreover, it is not necessary for the security officer to know what the assets Asset A and Asset C represent in this instance, as the security officer only needs to know that some asset exists which has sub-assets associated with the system under attack. The asset overlay map 208 can guide the security officer in protecting the assets without the security officer needing to know all of the specific details of the assets.

Note that the example asset overlay map 208 shown in FIG. 2 is merely an example form of the structure. Such an asset overlay map might contain additional information (or pointers to said information) to further help the organization. For example, the asset overlay map might also contain information such as the organization or entity which owns each asset, the contact information associated with each asset, the contact information for the administrator associated with each system, the physical location of each system, network connectivity information associated with each system, etc.

Note also, in one or more embodiments of the invention, that the asset overlay map is to be maintained such that it correctly represents the set of assets which reside in the organization, as well as the sub-assets for each asset, and the system or systems on which those sub-assets reside. As noted herein, organizations change over time, and this information is to be maintained or the asset overlay map will have decreased value in protecting the organization. In some situations, manual maintenance of the asset overlay map may be possible, but in other situations, automated maintenance may be preferred.

Figure 3:
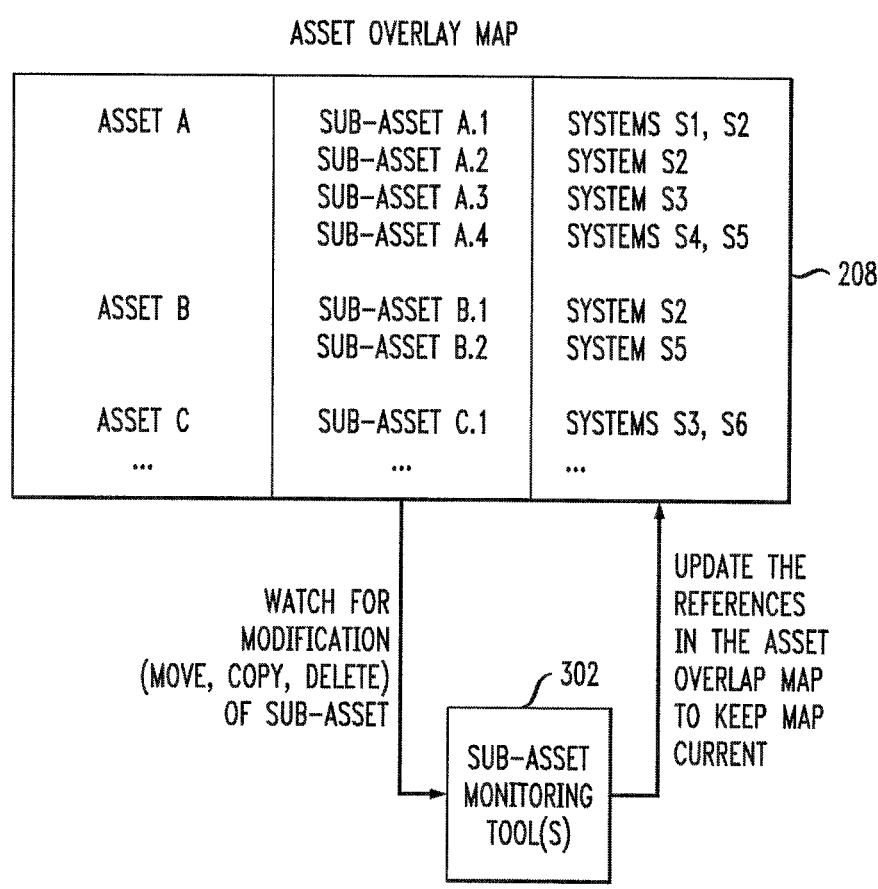
FIG. 3 is a diagram illustrating an example embodiment, according to an aspect of the invention.

FIG. 3 is a diagram illustrating an example embodiment, according to an aspect of the invention. By way of illustration, FIG. 3 depicts a sub-asset monitoring tool 302 that can be implemented for management of the asset overlay map 208 via the use of data management techniques similar to data leakage, access monitoring, or application monitoring tools. The sub-asset monitoring tool 302 can detect when sub-assets listed in the asset overlay map 208 are moved to a new location and/or are copied to add an additional system which contains the sub-asset. When a modification is detected (such as a new system is identified as holding a sub-asset) by the sub-asset monitoring tool 302, the sub-asset monitoring tool 302 can automatically update the asset overlay map 208 to keep the map current, as shown in FIG. 3.

Figure 4:
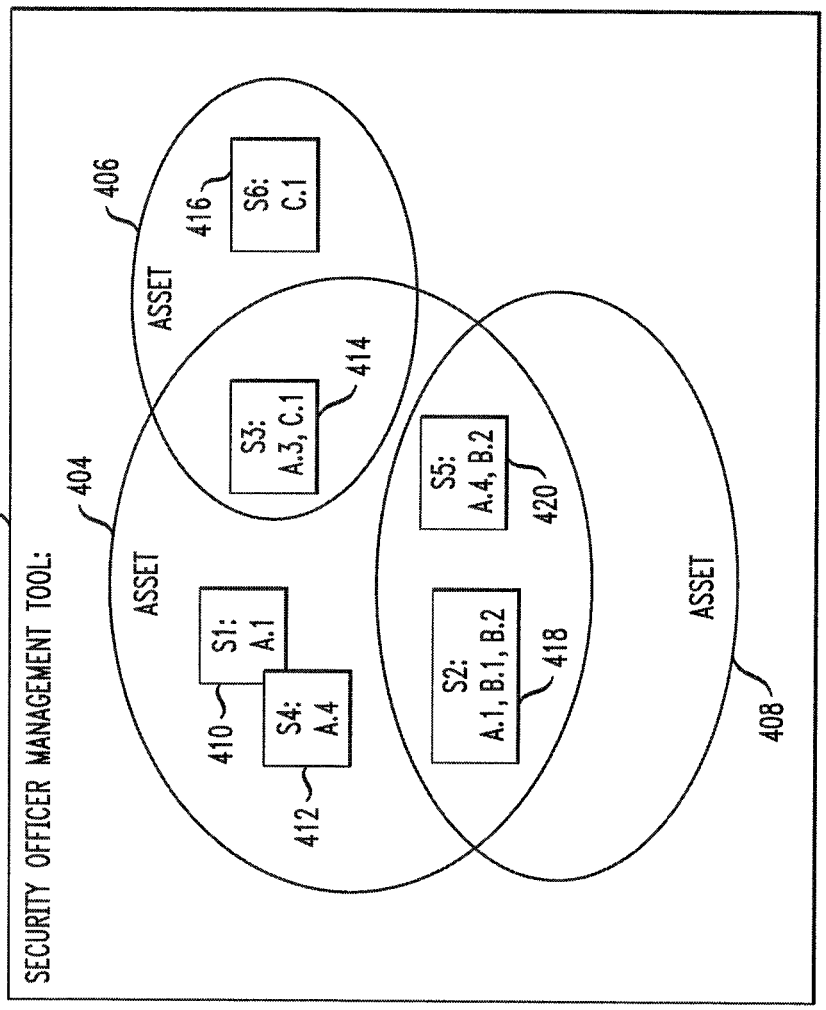
FIG. 4 is a diagram illustrating an example embodiment, according to an aspect of the invention.

FIG. 4 is a diagram illustrating an example embodiment, according to an aspect of the invention. By way of illustration, FIG. 4 depicts a security officer management tool 402, which provides an interface to display system components such as Assets 404, 406 and 408, as well as Sub-assets 410, 412, 414, 416, 418 and 420. As detailed herein, an asset overlay map can facilitate a security monitoring tool (402) which can guide the security officer in identifying systems and assets at risk in helping to stop a breach. By way of example, consider the following. Assume that the security administrator has a screen which can show the organization's assets and how the sub-assets relate to each other and the underlying systems. FIG. 4 is one example of how this screen might look.

Utilizing this tool 402, should system S1 come under attack, this screen could show S1 highlighted (for example, in red) to indicate the attack, and because system A1 contains only sub-assets associated with Asset A, systems S2, S3, S4 and S5 could be highlighted or marked (for example, in yellow) to indicate that those systems need attention to potentially stop a complete breach. From this view, the security administrator can switch, for example, to a network topological view, and manage the network as needed to disable or restrict access to systems S2, S3, S4, and S5. As mentioned above, the asset overlay map can contain additional information about the assets, sub-assets, and systems, such that, for example, double clicking on one of these components could bring-up such additional information to assist the security officer, such as the contact information of the person who owns that asset, sub-asset, or system.

By way of further illustration, consider the following example implementations of an embodiment of the invention. For instance, in one example, the asset survey can identify the presence of a credit card database, as well as a separate database on a different node which holds the credit card holder name, another database on a different node which holds the billing address, and yet another database on a different node which holds the purchase orders associated with that credit card, each database residing on a different system. This data would be imported into an asset overlap map, which includes a graphical user interface displaying the network topology.

Accordingly, when an attack against the node holding the credit card numbers is detected, the graphical map can immediately display the node(s) holding the credit card holder name, and the node(s) holding the credit card billing address (and, for example, highlight those nodes with a flashing red light) to indicate high risk to these systems. The system which is holding purchase orders for purchases made with that credit card can be additionally displayed (and, for example, highlighted in a flashing yellow light) to indicate a lower risk to the system.

CIR team members would be able to click on the highlighted nodes and execute procedures to disable access to these systems, as well as immediately obtain the name of the asset owner so that said owner can be warned about the attack. Also, for example, clicking on the flashing nodes can bring-up or generate physical location data, so that the relevant systems can be physically located to pull network connections or directly access the system.

Accordingly, in this example scenario, the attack may have initially accessed the database storing credit card numbers, but by precluding access to the databases storing the card holder names and the billing addresses, the attacker cannot make use of the asset(s).

In another example, for instance, the asset survey can identify the presence of a highly sensitive encrypted asset, and also determine that there are related assets residing on separate nodes which contain the decryption key for that asset as well as another node which contains a mapping of which customers are related to the highly sensitive encrypted asset. In this case, the highly sensitive encrypted asset may be considered so critical that any access to this encrypted asset would trigger automated procedures to disable access to the systems which hold the decryption key as well as to the systems which hold the customer mapping data. By using the data contained in an asset overlay map, an example embodiment of the invention can implement automated procedures to automatically (under policy control) disable access to these systems when an attack against the encrypted database is detected.

In this situation, the highly sensitive encrypted asset may be of such importance that encrypted assets are tagged. Data leakage tools running from the information contained in the asset overlay map (which was derived from the asset survey) can run periodically to look for the tag associated with the highly sensitive encrypted asset, and dynamically update the asset overlay map when it is detected that additional copies of the highly sensitive encrypted asset exist, or that the highly sensitive encrypted asset has moved to a new system.

Figure 5:
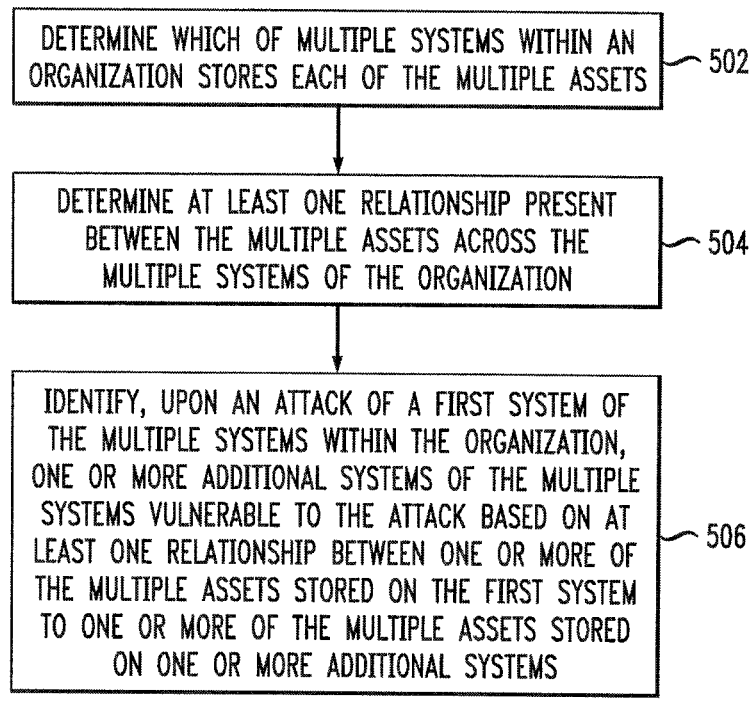
FIG. 5 is a flow diagram illustrating techniques according to an embodiment of the invention.

FIG. 5 is a flow diagram illustrating techniques according to an embodiment of the present invention. Step 502 includes determining which of multiple systems within an organization (such as a business, a corporation, etc.) stores each of multiple assets. As detailed herein, the multiple systems within an organization can include one or more divisions, one or more groups, and/or one or more departments within the organization. By way of example, large organizations may have multiple departments and/or groups which maintain their own asset inventory, and in an example implementation of at least one embodiment of the invention, multiple independent asset surveys can be used to gather a starting point for the mapping techniques detailed herein.

Step 504 includes determining at least one relationship present between the multiple assets across the multiple systems of the organization. Step 506 includes identifying, upon an attack of a first system of the multiple systems within the organization, one or more additional systems of the multiple systems vulnerable to the attack based on at least one relationship between one or more of the multiple assets stored on the first system to one or more of the multiple assets stored on one or more additional systems.

In at least one embodiment of the invention, this identifying step includes identifying which one or more of the multiple assets reside on the first system. Additionally, an additional step can include identifying one or more of the multiple assets residing on one or more additional systems of the multiple systems that are vulnerable to an attack related to the attack of the first system. Further, yet another additional step can include identifying the one or more additional systems of the multiple systems upon which the one or more of the multiple assets that are vulnerable to an attack related to the attack of the first system reside. By way of example, at least one embodiment of the invention can include marking or indicating (for example, via red coloring or highlighting) all identified assets related to assets involved in an attack, as well as all systems upon which those assets reside. Such an embodiment can further automatically trigger a shutdown of each of those identified systems.

As described herein, at least one embodiment of the invention includes implementing one or more automated processes upon identifying the one or more additional systems of the multiple systems vulnerable to the attack. Such automated processes can include, for example, a process to automatically prohibit access to the one or more additional systems of the multiple systems vulnerable to the attack.

The techniques depicted in FIG. 5 also include creating an asset overlay map based on said determination of which of multiple systems within an organization stores each of multiple assets and said determination of the at least one relationship present between the multiple assets across the multiple systems of the organization. Additionally, at least one embodiment of the invention includes connecting the asset overlay map to a display tool to visually indicate the one or more additional systems of the multiple systems vulnerable to the attack.

Further, the techniques depicted in FIG. 5 can also include dividing one or more of the multiple assets into multiple sub-assets. At least one embodiment of the invention can additionally include encrypting at least a portion of the multiple sub-assets, and storing the multiple sub-assets and one or more keys associated with said encrypting across the multiple systems within the organization.

Additionally, the techniques depicted in FIG. 5 can include collecting information pertaining to the multiple assets such as the owner of each asset, the contact for managing each asset, and the format of the stored form of each asset. Also, at least one embodiment of the invention includes collecting information pertaining to the multiple systems within an organization such as a system name for each system, a system internet protocol address for each system, and a physical location of each system.

The techniques depicted in FIG. 5 can further include loading the determination of which of multiple systems within an organization stores each of multiple assets and said determination of the at least one relationship present between the multiple assets across the multiple systems of the organization into a database associated with a critical incident response center.

Also, at least one embodiment of the invention includes updating the determination of which of multiple systems within an organization stores each of multiple assets and said determination of the at least one relationship present between the multiple assets across the multiple systems of the organization. This step of updating can include, for example, periodically performing a manual asset review of the multiple systems, identifying each asset on a new system being incorporated into the organization, and automatically scanning each of the multiple systems to identify at least one of movement, replication, and deletion of one or more assets. Such automatic scanning can include automatically scanning one or more fields associated with each asset stored on the multiple systems, wherein the fields identify asset format, an asset tag, etc.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and configured to perform the techniques detailed herein. Also, as described herein, aspects of the present invention may take the form of a computer program product embodied in a computer readable medium having computer readable program code embodied thereon.

Figure 6:
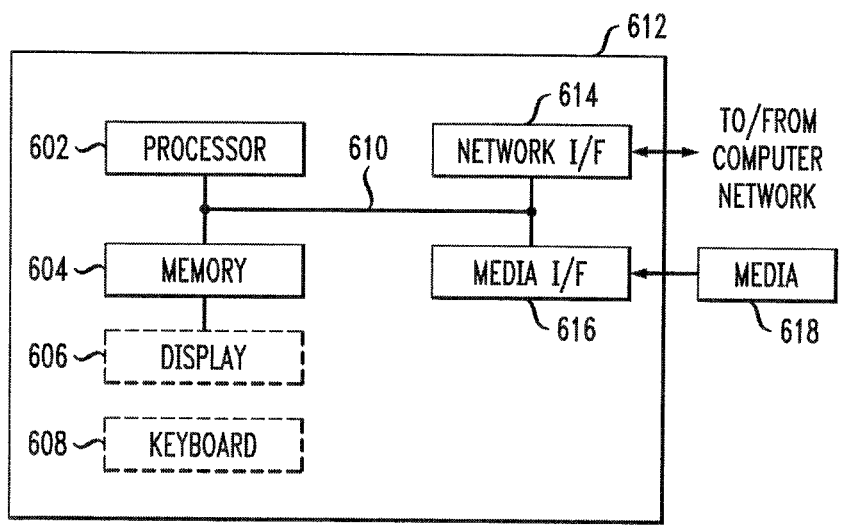
FIG. 6 is a system diagram of an exemplary computer system on which at least one embodiment of the invention can be implemented.

By way of example, an aspect of the present invention can make use of software running on a general purpose computer. As noted above, FIG. 6 is a system diagram of an exemplary computer system on which at least one embodiment of the invention can be implemented. As depicted in FIG. 6, an example implementation employs, for example, a processor 602, a memory 604, and an input/output interface formed, for example, by a display 606 and a keyboard 608. The term "processor" as used herein includes any processing device(s), such as, for example, one that includes a CPU (central processing unit) and/or other forms of processing circuitry. The term "memory" includes memory associated with a processor or CPU, such as, for example, RAM (random access memory), ROM (read only memory), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 602, memory 604, and input/output interface such as display 606 and keyboard 608 can be interconnected, for example, via bus 610 as part of a data processing unit 612. Suitable interconnections via bus 610, can also be provided to a network interface 614 (such as a network card), which can be provided to interface with a computer network, and to a media interface 616 (such as a diskette or CD-ROM drive), which can be provided to interface with media 618.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 608, displays 606, and pointing devices, can be coupled to the system either directly (such as via bus 610) or through intervening I/O controllers.

Network adapters such as network interface 614 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 612 as depicted in FIG. 6) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

It should again be emphasized that the above-described embodiments of the invention are presented for purposes of illustration only. Many variations and other alternative embodiments may be used. For example, the techniques are applicable to a wide variety of other types of communication systems and cryptographic devices that can benefit from incident response management. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
dividing each of multiple assets associated with an organization into multiple sub-assets;
storing the multiple sub-assets across multiple systems within the organization;
determining a set of at least one relationship present between the multiple sub-assets across the multiple systems of the organization;
loading (i) a determination of which of the multiple systems stores each of the multiple sub-assets and (ii) the set of at least one relationship present between the multiple sub-assets across the multiple systems into a database associated with a critical incident response center;
identifying, upon an attack of a first system of the multiple systems within the organization, one or more additional systems of the multiple systems vulnerable to the attack based on at least one relationship, from the determined set of at least one relationship, between one or more of the multiple sub-assets stored on the first system and one or more of the multiple sub-assets stored on the one or more additional systems; and
automatically prohibiting access to the one or more additional systems of the multiple systems storing the one or more of the multiple sub-assets identified based on the at least one relationship with the one or more sub-assets stored on the first system;
wherein the steps are carried out by at least one computer device.

2. The method of claim 1, wherein said identifying comprises identifying which one or more of the multiple sub-assets reside on the first system.

3. The method of claim 2, wherein said identifying one or more additional systems comprises identifying one or more of the multiple sub-assets residing on one or more additional systems of the multiple systems that are vulnerable to an attack related to the attack of the first system.

4. The method of claim 3, wherein said identifying one or more additional systems comprises identifying the one or more additional systems of the multiple systems upon which the one or more of the multiple sub-assets that are vulnerable to an attack related to the attack of the first system reside.

5. The method of claim 1, further comprising:
creating an asset overlay map based on said determination of which of the multiple systems within an organization stores each of the multiple sub-assets and said determination of the at least one relationship present between the multiple sub-assets across the multiple systems of the organization.

6. The method of claim 5, further comprising:
connecting the asset overlay map to a display tool to visually indicate the one or more additional systems of the multiple systems vulnerable to the attack.

7. The method of claim 1, wherein the multiple systems within an organization comprise at least one of one or more divisions, one or more groups, one or more or departments within the organization.

8. The method of claim 1, further comprising:
collecting information pertaining to the multiple assets.

9. The method of claim 8, wherein said information comprises at least one of an owner of each asset, a contact for managing each asset, and a format of the stored form of each asset.

10. The method of claim 1, further comprising:
collecting information pertaining to the multiple systems within an organization, wherein said information comprises at least one of a system name for each system, a system internet protocol address for each system, and a physical location of each system.

11. The method of claim 1, further comprising:
implementing one or more automated processes upon identifying the one or more additional systems of the multiple systems vulnerable to the attack.

12. The method of claim 1, further comprising:
updating said determination of which of multiple systems within an organization stores each of multiple sub-assets and said determination of the at least one relationship present between the multiple sub-assets across the multiple systems of the organization.

13. The method of claim 12, wherein said updating comprises at least one of identifying each sub-asset on a new system being incorporated into the organization, automatically scanning each of the multiple systems to identify at least one of movement, replication, and deletion of one or more sub-assets, and periodically performing a manual sub-asset review of the multiple systems.

14. The method of claim 13, wherein said automatically scanning comprises automatically scanning one or more fields associated with each sub-asset stored on the multiple systems, wherein said one or more fields identify at least one of sub-asset format and an sub-asset tag.

15. The method of claim 1, further comprising:
encrypting at least a portion of the multiple sub-assets; and
storing one or more keys associated with said encrypting across the multiple systems within the organization.

16. An article of manufacture comprising a non-transitory processor-readable storage medium having processor-readable instructions tangibly embodied thereon which, when implemented, cause a processor to carry out the steps of the method of claim 1.

17. An apparatus comprising:
a memory; and
at least one processor coupled to the memory and configured to:
divide each of multiple assets associated with an organization into multiple sub-assets;
store the multiple sub-assets across multiple systems within the organization;
determine a set of at least one relationship present between the multiple sub-assets across the multiple systems of the organization;
load (i) a determination of which of the multiple systems stores each of the multiple sub-assets and (ii) the set of at least one relationship present between the multiple sub-assets across the multiple systems into a database associated with a critical incident response center;
identify, upon an attack of a first system of the multiple systems within the organization, one or more additional systems of the multiple systems vulnerable to the attack based on at least one relationship, from the determined set of at least one relationship, between one or more of the multiple sub-assets stored on the first system and one or more of the multiple sub-assets stored on the one or more additional systems; and
automatically prohibit access to the one or more additional systems of the multiple systems storing the one or more of the multiple sub-assets identified based on the at least one relationship with the one or more sub-assets stored on the first system.

18. The apparatus of claim 17, wherein the at least one processor is further configured to:
create an asset overlay map based on said determination of which of the multiple systems within an organization stores each of the multiple sub-assets and said determination of the at least one relationship present between the multiple sub-assets across the multiple systems of the organization.

19. The apparatus of claim 17, wherein the at least one processor is further configured to:
connect the asset overlay map to a display tool to visually indicate the one or more additional systems of the multiple systems vulnerable to the attack.

20. The apparatus of claim 17, wherein the at least one processor is further configured to:
encrypt at least a portion of the multiple sub-assets; and
store one or more keys associated with said encrypting across the multiple systems within the organization.

\* \* \* \* \*